United States Patent
Hayashi et al.

(10) Patent No.: US 12,525,907 B2
(45) Date of Patent: Jan. 13, 2026

(54) MOTOR DRIVE CONTROL DEVICE AND FAN UNIT

(71) Applicant: MINEBEA MITSUMI Inc., Nagano (JP)

(72) Inventors: Kimihiro Hayashi, Nagano (JP); Shuhei Nishi, Nagano (JP)

(73) Assignee: MINEBEA MITSUMI Inc., Nagano (JP)

( * ) Notice: Subject to any disclaimer, the term of this patent is extended or adjusted under 35 U.S.C. 154(b) by 151 days.

(21) Appl. No.: 18/507,159

(22) Filed: Nov. 13, 2023

(65) Prior Publication Data

US 2024/0162843 A1  May 16, 2024

(30) Foreign Application Priority Data

Nov. 15, 2022 (JP) ................. 2022-182320

(51) Int. Cl.
*H02P 21/20* (2016.01)
*H02P 21/06* (2016.01)
*H02P 21/18* (2016.01)

(52) U.S. Cl.
CPC .............. *H02P 21/20* (2016.02); *H02P 21/06* (2013.01); *H02P 21/18* (2016.02)

(58) Field of Classification Search
CPC .......... H02P 21/20; H02P 21/06; H02P 21/18; H02P 6/08; F04D 27/004; F04D 27/00
USPC ........................ 318/432, 400.15, 400.01, 700
See application file for complete search history.

(56) References Cited

U.S. PATENT DOCUMENTS

| 5,629,598 | A | * | 5/1997 | Wilkerson | .............. | H02P 6/182 318/808 |
| 7,084,598 | B2 | * | 8/2006 | Yoshida | .................. | F04B 49/20 318/434 |
| 8,259,150 | B2 | * | 9/2012 | Kubo | .................... | H04N 1/0473 347/132 |
| 8,297,068 | B2 | * | 10/2012 | Yokouchi | .............. | H02P 27/045 62/239 |

(Continued)

FOREIGN PATENT DOCUMENTS

EP  2 128 977 A1  12/2009
JP  5327045 B2  10/2013

*Primary Examiner* — David Luo
(74) *Attorney, Agent, or Firm* — Chrisman Gallo Tochtrop LLC

(57) ABSTRACT

A motor drive control device includes a control circuit configured to output a drive control signal for controlling the drive of a motor of a fan and a motor drive circuit configured to drive the motor, based on the drive control signal. The control circuit includes a storage unit configured to store correspondence information indicating a relationship between a value based on the rotation speed and the torque of the motor when the motor output is constant at a predetermined value, a target torque determination unit configured to determine a target torque value from the rotation speed by using the correspondence information corresponding to a specified motor output, a target rotation speed determination unit configured to determine a target rotation speed for reducing a difference between the target torque value and a torque value of the motor, and a drive control signal generation unit configured to generate the drive control signal for causing the rotation speed of the motor to approach the target rotation speed.

5 Claims, 6 Drawing Sheets

(56) References Cited

U.S. PATENT DOCUMENTS

2010/0101265 A1   4/2010  Yokouchi et al.

* cited by examiner

MOTOR DRIVE CONTROL DEVICE AND FAN UNIT

CROSS-REFERENCE TO RELATED APPLICATIONS

This application claims the benefit of priority to Japanese Patent Application Number 2022-182320 filed on Nov. 15, 2022. The entire contents of the above-identified application are hereby incorporated by reference.

TECHNICAL FIELD

The present invention relates to a motor drive control device and a fan unit.

BACKGROUND ART

Known motor drive control devices for driving a motor of a fan such as a ventilation fan and a dryer include a motor drive control device having a constant air flow control function of controlling the motor so that the amount of air blown by the fan is constant even when the static pressure or the like changes. For example, Patent Document 1 discloses a technique for maintaining a constant air flow of a fan by correcting the rotation speed of a motor by using a predetermined air flow value and a torque value of the motor.

CITATION LIST

Patent Literature

Patent Document 1: JP 5327045 B

SUMMARY OF INVENTION

Technical Problem

In recent years, power saving and cost reduction of a fan such as a ventilation fan and a dryer have been desired. The inventors of the present application considered constant motor output control of controlling a motor output (work amount per unit time) of a motor to be constant to be indispensable for achieving power saving and cost reduction of a fan.

However, the conventional constant motor output control technique calls for a complicated configuration and calculation, and achieving power saving and cost reduction of a fan requires achieving constant motor output control by a simple configuration and calculation.

The present invention has been contrived to solve the problems mentioned above, and an object of the present invention is to achieve constant motor output control by a simple configuration and calculation.

Solution to Problem

A motor drive control device according to a typical embodiment of the present invention includes a control circuit configured to output a drive control signal for controlling drive of a motor; and a motor drive circuit configured to drive the motor based on the drive control signal output from the control circuit, wherein the control circuit includes a storage unit configured to store correspondence information indicating a relationship between a value based on a rotation speed and a torque of the motor when a motor output of the motor is constant at a predetermined value, a target torque determination unit configured to determine a target torque value from the value based on the rotation speed of the motor by using the correspondence information corresponding to the motor output specified, a torque acquisition unit configured to acquire a torque value of the motor, a target rotation speed determination unit configured to determine a target rotation speed of the motor, the target rotation speed being a speed for reducing a difference between the target torque value and the torque value acquired by the torque acquisition unit, and a drive control signal generation unit configured to generate the drive control signal based on the target rotation speed.

Advantageous Effects of Invention

According to one aspect of the present invention, constant motor output control can be achieved by a simple configuration and calculation.

DESCRIPTION OF EMBODIMENTS

1. Overview of Embodiments

Figure 1:
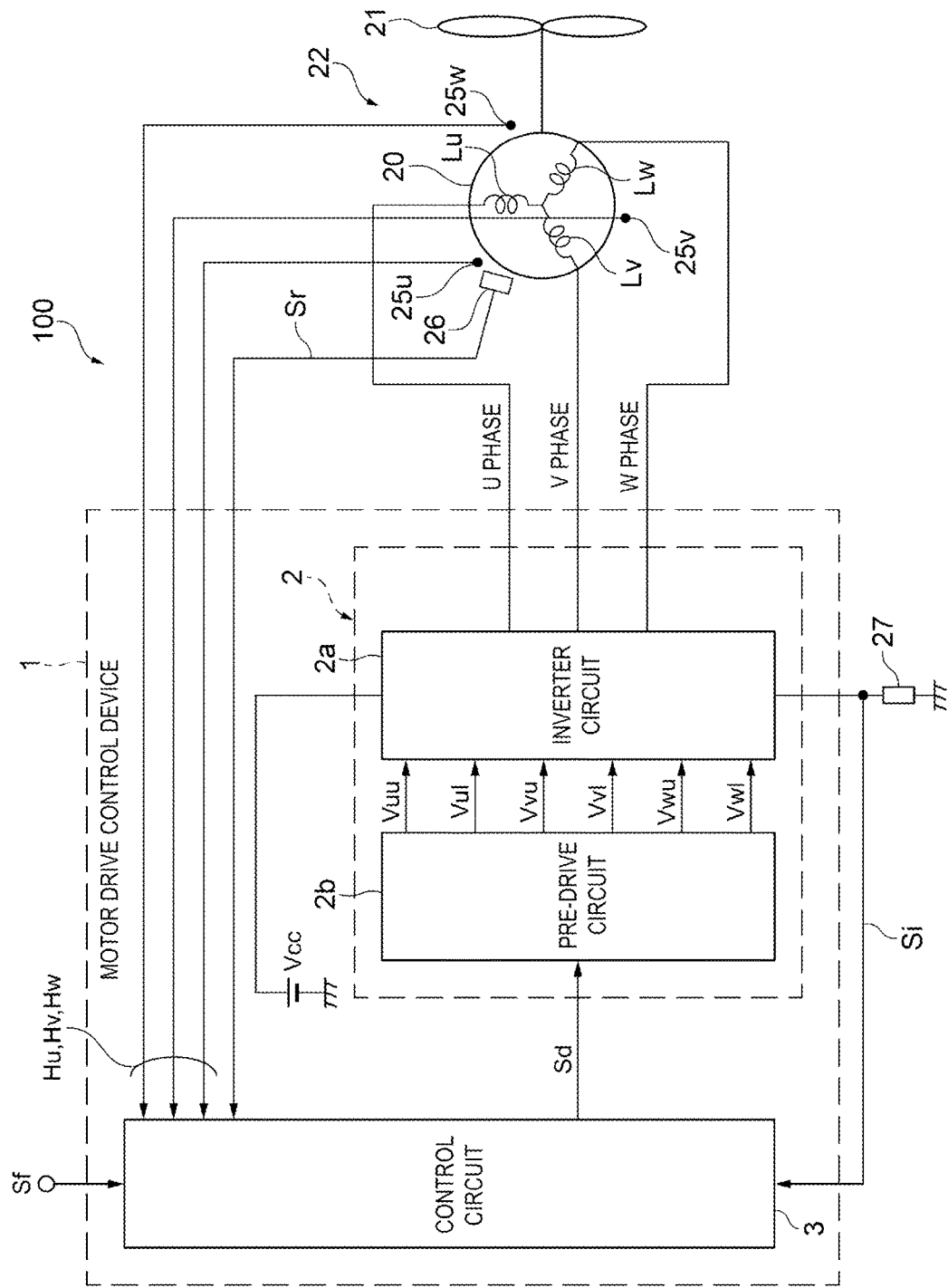
FIG. 1 is a diagram illustrating a configuration of a fan unit including a motor drive control device according to the present embodiment.

First, an overview of typical embodiments of the invention disclosed in the present application will be described. In the following description, reference signs on the drawings corresponding to the components of the invention are illustrated in parentheses as an example.

[1] A motor drive control device (1) according to a typical embodiment of the present invention includes a control circuit (3) configured to output a drive control signal (Sd) for controlling the drive of a motor (20), and a motor drive circuit (2) configured to drive the motor based on the drive control signal output from the control circuit. The control circuit includes a storage unit (31) configured to store correspondence information (310, 310_1 to 310_n) indicating a relationship between a value based on a rotation speed and a torque of the motor when a motor output of the motor is constant at a predetermined value, a target torque determination unit (30) configured to determine a target torque value (Tg) from the value based on the rotation speed of the motor by using the correspondence information corresponding to the motor output specified, a torque acquisition unit (32) configured to acquire a torque value (Ts) of the motor, a target rotation speed determination unit (34) configured to determine a target rotation speed (EXC) of the motor, the target rotation speed being a speed for reducing a difference (ΔT) between the target torque value and the torque value acquired by the torque acquisition unit, and a drive control signal generation unit (35) configured to generate the drive control signal based on the target rotation speed.

[2] In the motor drive control device according to [1] above, the value based on the rotation speed of the motor may be a period (Hp) of a rotation position detection signal (Hu, Hv, Hw) having a voltage periodically changing in accordance with a rotation position of a rotor of the motor.

[3] In the motor drive control device according to [1] above, the value based on the rotation speed of the motor may be a reciprocal of the rotation speed of the motor.

[4] In the motor drive control device according to any one of [1] to [3] above, the torque acquisition unit may acquire a value (Iq) of a q-axis current corresponding to the torque of the motor as the torque value, and the target torque determination unit may determine a target value (Iq_g) of the q-axis current as the target torque value (Tg).

[5] In the motor drive control device according to [4] above, the motor may include coils (Lu, Lv, Lw) in three phases, the drive control signal generation unit may calculate, based on currents (Si) flowing in the coils of respective phases of the motor, each of the q-axis current and a d-axis current corresponding to a magnetic flux of the motor, determine a duty cycle for making the q-axis current calculated and the d-axis current calculated respectively equal to target current values (Iq_req and Id_ref) corresponding to the target rotation speed, and output a PWM signal having the duty cycle as the drive control signal, and the torque acquisition unit may acquire the q-axis current calculated by the drive control signal generation unit as the torque value.

[6] In the motor drive control device according to any one of [1] to [5] above, the correspondence information may include a function (601 to 603) expressing a relationship between the value based on the rotation speed and the torque of the motor, and the storage unit may store the function for each of command values for a plurality of the motor outputs specifiable.

[7] A fan unit (100) according to a typical embodiment of the present invention includes the motor drive control device (1) according to any one of [1] to [5] above, the motor (20) configured to be driven by the motor drive control device, and an impeller (21) configured to rotate by a rotation force of the motor.

2. Specific Examples of Embodiments

Specific examples of the embodiments of the present invention will be described below with reference to the drawings. In the following description, components common to the respective embodiments are denoted by the same reference signs, and repeated descriptions are omitted. Furthermore, it should be noted that the drawings are schematic drawings and the dimensional relationships, proportions, and the like between elements in the drawings may differ from reality. The drawings may include parts having mutually different dimensional relationships and proportions.

EMBODIMENTS

FIG. 1 is a diagram illustrating a configuration of the fan unit including the motor drive control device 1 according to the present embodiment.

The fan unit 100 illustrated in FIG. 1 is a device configured to generate an airflow by rotating an impeller (bladed wheel). The fan unit 100 can be applied to a dryer and ventilation equipment (a ventilation fan), for example.

As illustrated in FIG. 1, the fan unit 100 includes the motor 20, the impeller 21, a rotation position detector 25 configured to detect a rotation position of the motor 20, a rotation speed detector 26 configured to detect a rotation speed of the motor 20, a current detector 27 configured to detect a current flowing in the motor 20, and the motor drive control device 1 configured to drive the motor 20.

The motor 20 is a brushless motor, for example. In the present embodiment, the motor 20 is a brushless motor including coils in three phases. The motor drive control device 1 is a device used for controlling the rotation of the motor 20. For example, the motor drive control device 1 outputs a sine wave drive signal to the motor 20 and causes a drive current having a sine wave form to periodically flow to coils Lu, Lv, and Lw in the three phases of the motor 20 to rotate the motor 20.

The impeller (bladed wheel) 21 is a component configured to generate an airflow, and is configured to rotate by the rotation force of the motor 20. For example, a rotation shaft of the impeller 21 is coaxially coupled to an output shaft of the motor 20. In the present embodiment, the impeller 21 and the motor 20 form one fan 22, for example.

The motor drive control device 1 includes a motor drive circuit 2 and a control circuit 3. Note that not all of the components of the motor drive control device 1 are illustrated in FIG. 1, and the motor drive control device 1 may include other constitution elements, in addition to the constitution elements illustrated in FIG. 1.

The motor drive circuit 2 drives the motor 20, based on the drive control signal Sd output from the control circuit 3 described later. The motor drive circuit 2 includes an inverter circuit 2a and a pre-drive circuit 2b.

The inverter circuit 2a outputs a drive signal to the motor 20, based on an output signal output from the pre-drive circuit 2b, and causes current to flow in the coils Lu, Lv, and Lw included in the motor 20. For example, in the inverter circuit 2a, a pair of two switch elements connected in series between a DC power supply Vcc and a ground potential are disposed for each phase (a U-phase, a V-phase, and a W-phase) of the coils Lu, Lv, and Lw. In each of the pairs of two switch elements, the terminals of each phase of the motor 20 are connected to a connection point between the switch elements.

Based on the drive control signal Sd from the control circuit 3, the pre-drive circuit 2b generates an output signal used for driving the inverter circuit 2a and outputs the generated output signal to the inverter circuit 2a.

The drive control signal Sd is a signal used for controlling the drive of the motor 20 and is a pulse width modulation (PWM) signal, for example. Specifically, the drive control signal Sd includes six types of PWM signals corresponding to each of the switch elements of the inverter circuit 2a. More specifically, the drive control signal Sd is a signal for switching the on/off of the respective switch elements constituting the inverter circuit 2a.

Based on the drive control signal Sd, the pre-drive circuit 2b generates and outputs six types of drive signals Vuu, Vul, Vvu, Vvl, Vwu, and Vwl for driving each of the switch elements of the inverter circuit 2a, for example. When these drive signals are input into the inverter circuit 2a, the switch elements constituting the inverter circuit 2a and corresponding to each of the drive signals turn on and off. Controlling the on/off of the respective switch elements of the inverter circuit 2a switches the energization patterns of the coils Lu, Lv, and Lw of the motor 20, supplying electric power to each phase of the motor 20.

Rotation position detectors 25u, 25v, and 25w generate signals in accordance with the rotation position of a rotor of the motor 20. The rotation position detectors 25u, 25v, and 25w are Hall elements, for example. Hereinafter, the rotation position detectors 25u, 25v, and 25w are also referred to as "Hall elements 25u, 25v, and 25w".

The three Hall elements 25u, 25v, and 25w are provided corresponding to the respective phases (the U-phase, the V-phase, and the W-phase) of the motor 20, respectively. For example, the Hall elements 25u, 25v, and 25w are disposed around the rotor (rotating element) of the motor 20 at substantially equal intervals from each other (for example, at an interval of 120 degree to an adjacent Hall elements).

The Hall elements 25u, 25v, and 25w each detect a magnetic pole of the rotor of the motor 20 and each output a Hall signal having a voltage periodically changing in accordance with the rotation position of the rotor. Hereinafter, the Hall signals output from the respective Hall elements 25u, 25v, and 25w are also referred to as "rotation position detection signals Hu, Hv, and Hw".

The rotation position detection signals Hu, Hv, and Hw are input into the control circuit 3. Note that, the control circuit 3 may be configured so that, instead of the Hall signal, another signal corresponding to the rotation position of the rotor of the motor 20 is input as the rotation position detection signal into the control circuit 3. For example, an encoder, a resolver, a motor current detection circuit, or the like may be provided, and a detection signal of the encoder, the resolver, the motor current detection circuit, or the like may be input into the control circuit 3. That is, the rotation position detectors 25u, 25v, 25w are not limited to the Hall elements.

The rotation speed detector 26 generates a rotation speed signal Sr in accordance with the rotation of the rotor of the motor 20. For example, the rotation speed detector 26 is a frequency generator (FG) pattern formed on a substrate (a printed circuit board) mounted with the motor 20. The FG pattern functioning as the rotation speed detector 26 generates a signal (an FG signal) having a period corresponding to the number of rotations of the motor 20. The FG signal output from the rotation speed detector 26 is input into the control circuit 3 as the rotation speed signal Sr.

Note that, in the present example, the FG pattern is used as the rotation speed detector 26, but this is not intended as a limitation, and another rotation speed detector such as an encoder and a resolver may be used. Alternatively, the rotation speed detector 26 may derive the rotation speed based on the Hall signals (the rotation position detection signals Hu, Hv, and Hw) and input the rotation speed to the control circuit 3 as the rotation speed signal Sr, or the control circuit 3 may calculate the rotation speed based on the Hall signals.

The current detector 27 generates a current detection signal Si corresponding to a current value of the current flowing on a DC side of the inverter circuit 2a constituting the motor drive circuit 2. For example, the current detector 27 is a current detection element disposed on a negative side (ground side) of the inverter circuit, and is a resistor (shunt resistor), for example. The current detection element functioning as the current detector 27 generates a voltage in accordance with the current flowing in the current detection element and outputs the voltage as the current detection signal Si.

Based on an output command signal Sf specifying the magnitude of the motor output, the control circuit 3 generates the drive control signal Sd for driving the motor 20, and supplies the drive control signal Sd to the motor drive circuit 2. Specifically, based on the rotation position detection signals Hu, Hv, and Hw and the rotation speed signal Sr, the control circuit 3 acquires information such as the rotation position and the rotation speed of the rotor of the motor 20 to monitor a rotation state of the motor 20, and generates the drive control signal Sd for causing the motor output of the motor 20 to take a value specified by the output command signal Sf to control the drive of the motor 20.

In the present embodiment, the control circuit 3 is achieved by a program processing device (for example, a microcontroller) including a processor such as a CPU, various types of storage devices such as a RAM and a ROM, and a peripheral circuit such as a counter (a timer), an A/D conversion circuit, a D/A conversion circuit, a clock generation circuit, and an input/output I/F circuit, for example. In the program processing device, the processor, the storage devices, and the peripheral circuit are connected with each other via a bus or a dedicated line, for example.

Note that the motor drive control device 1 may be configured to include a single integrated circuit device (IC) package containing at least a part of the control circuit 3 and at least a part of the motor drive circuit 2, or configured to include separate integrated circuit device packages each containing one of the control circuit 3 and the motor drive circuit 2.

When controlling the fan 22 based on the output command signal Sf, the control circuit 3 performs the constant motor output control to generate the drive control signal Sd for making the motor output of the motor 20 constant. The constant motor output control performed by the control circuit 3 will be described below.

Figure 2:
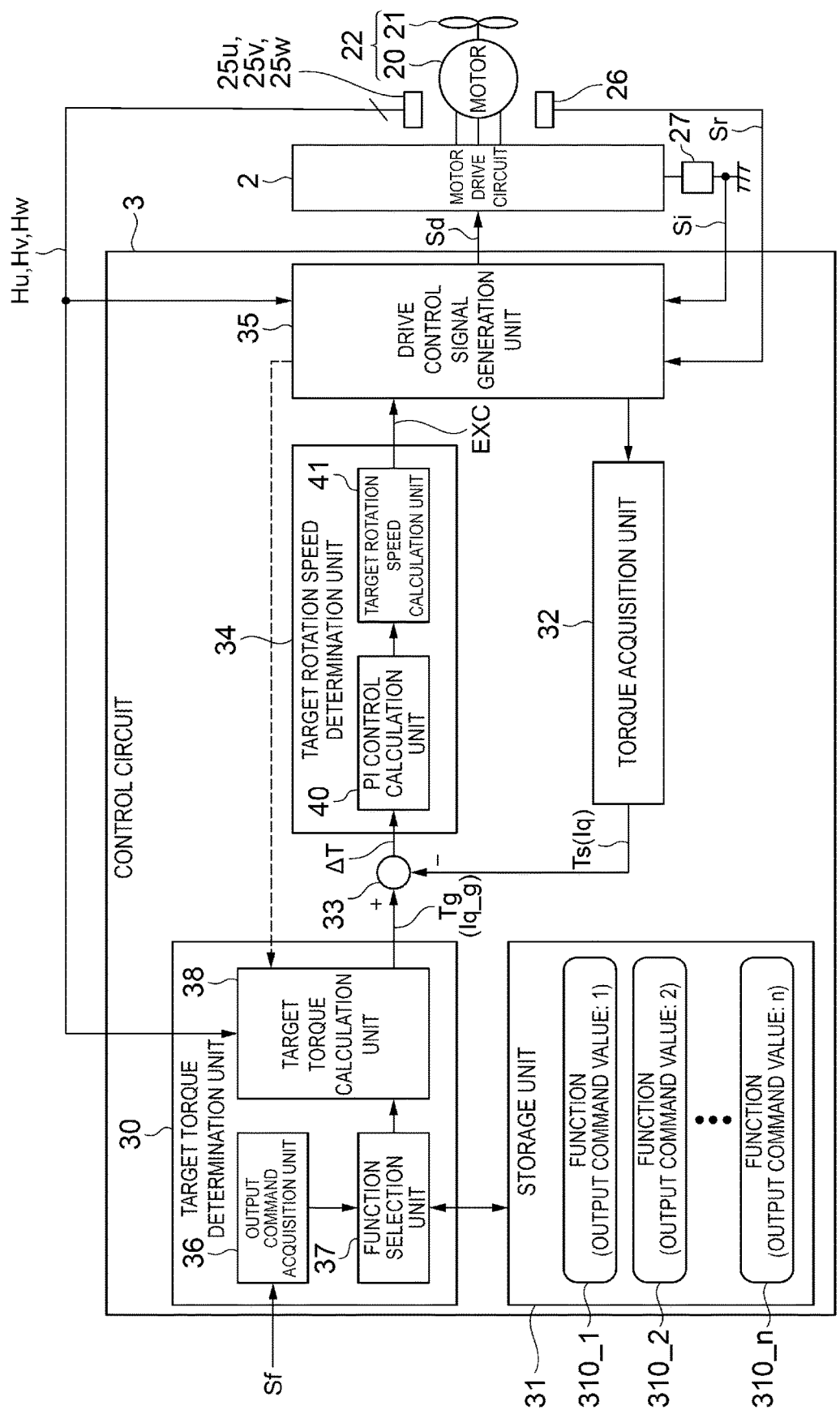
FIG. 2 is a diagram illustrating a functional block configuration of a control circuit.

FIG. 2 is a diagram illustrating a functional block configuration of the control circuit 3.

As illustrated in FIG. 2, the control circuit 3 includes a target torque determination unit 30, a storage unit 31, a torque acquisition unit 32, an error calculation unit 33, a target rotation speed determination unit 34, and a drive control signal generation unit 35 as functional blocks for achieving the constant motor output control. In a program processing device functioning as the control circuit 3, these functional blocks are achieved, for example, by a processor executing various types of calculation processing in accordance with a program stored in a memory, and controlling a peripheral circuit such as a counter and an A/D conversion circuit. A part or the whole of the functional blocks constituting the control circuit 3 may be achieved by a dedicated hardware circuit.

The target torque determination unit 30 is a functional unit configured to determine a target value of the torque (hereinafter, referred to as "target torque value") of the motor 20 required for the motor output (work amount per unit time) of the motor 20 to be a value specified by the output command signal Sf. As will be described in detail later, the target torque determination unit 30 calculates the target torque value Tg from the value based on the rotation speed by using correspondence information 310 indicating the relationship between the value based on the rotation speed and the torque of the motor.

The storage unit 31 is a functional unit configured to store a parameter and the like required for the constant motor output control. For example, the storage unit 31 stores data such as the correspondence information 310 and an initial value of a target rotation speed EXC provided for each motor output command value.

As described above, the correspondence information 310 is data indicating a relationship between the value based on the rotation speed and the torque of the motor 20 when the motor output of the motor 20 is constant at a predetermined value.

Here, the value based on the rotation speed of the motor 20 is, for example, the period of the rotation position detection signals Hu, Hv, and Hw or the reciprocal of the rotation speed (rpm).

In the present embodiment, as an example, the value based on the rotation speed of the motor 20 is a period of any one of the rotation position detection signals Hu, Hv, and Hw, and the period is referred to as a "Hall period Hp".

In general, it is known that a torque of a motor is proportional to a current of the q-axis in a two axis (q-axis, d-axis) rotation coordinate system in vector control of the motor. Therefore, in the present embodiment, as an example, the q-axis current Iq is used as a physical amount representing the torque of the motor.

In general, the motor output, that is, a work amount P (W) per unit time is represented by Equation (1) below. In Equation (1), T is a torque (N·m), and N is a rotation speed (rpm).

[Equation 1]
$$P = \frac{2\pi}{60}TN \quad (1)$$

As described above, in the vector control of the motor, the q-axis current Iq and the torque T of the motor are proportional to each other, and thus Equation (2) below is established. α is a constant.

$$T = \alpha Iq \quad \text{[Equation 2]}$$

Since a rotation speed N of the motor is inversely proportional to a Hall period Hp (s), Equation (3) below is established. β is a constant.

[Equation 3]
$$N = \frac{\beta}{Hp} \quad (3)$$

From Equations (1) to (3) above, Equation (4) below is established for the q-axis current Iq.

[Equation 4]
$$I_q = \frac{6OP}{2\pi\alpha\beta}H_p \quad (4)$$

As understood from Equation (4) above, when the motor output P is constant, the relationship between the q-axis current Iq (torque) and the Hall period Hp can be expressed by a linear equation.

Figure 3:
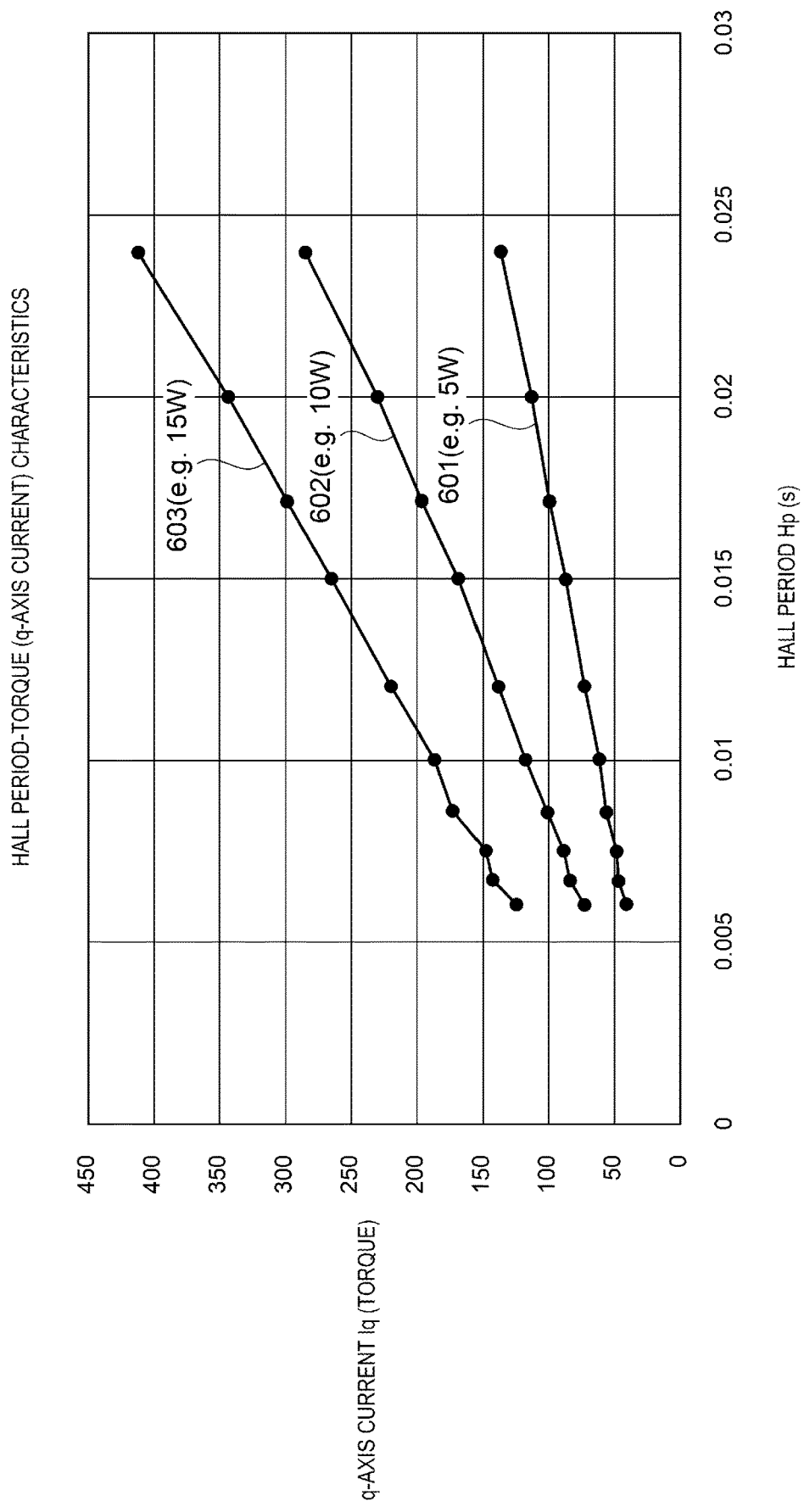
FIG. 3 is a graph showing a relationship between a Hall period and a q-axis current (torque) of a motor.

FIG. 3 is a graph showing the relationship between the Hall period and the q-axis current (torque) of the motor.

In FIG. 3, the horizontal axis represents the Hall period Hp, and the vertical axis represents the q-axis current Iq as the torque of the motor 20.

Each of the graphs indicated by reference signs 601 to 603 is of Hall period-torque characteristics indicating a relationship between a measured value of the Hall period Hp and a measured value of the q-axis current Iq (torque) of the motor 20 when the motor 20 is caused to operate with the motor output of the motor 20 being constant at a predetermined value. Specifically, reference sign 601 represents characteristics of the q-axis current Iq (torque) of the motor 20 with respect to the Hall period Hp when the motor output of the motor 20 is at a first value (W1=5 W (watt)). Reference sign 602 represents characteristics of the q-axis current Iq of the motor 20 with respect to the Hall period Hp when the motor output of the motor 20 is at a second value (W2=10 W). Reference sign 603 represents characteristics of the q-axis current Iq of the motor 20 with respect to the Hall period Hp when the motor output of the motor 20 is at a third value (W3=15 W).

According to FIG. 3, it is understood that the Hall period-torque characteristics of the motor based on the actual measurement result can be approximated by a linear equation as shown in Equation (4) described above. Therefore, if the Hall period (rotation speed) and the q-axis current of the motor 20 are controlled to change along the characteristics 601 to 603 in accordance with the motor output required of the motor 20, it is possible to cause the motor 20 to operate with the motor output being constant at a required value.

Thus, in the motor drive control device 1 according to the present embodiment, the correspondence information 310 representing the relationship between the value based on the rotation speed (Hall period Hp) and the torque (q-axis current Ig) of the motor 20 for each motor output is stored in advance in the storage unit 31, and the rotation speed and the torque of the motor 20 are adjusted by using the correspondence information 310 to make a motor output of the motor 20 constant.

Specifically, the storage unit 31 stores the functions corresponding to command values for a plurality of motor outputs specifiable in the motor 20 as the correspondence information 310. For example, when the motor output is switchable in n (n being an integer of 2 or greater) levels in the motor 20, the functions expressing the relationship between the Hall period Hp and the q-axis current Iq are stored in the storage unit 31 for each of the n levels of motor output command values, as the correspondence information 310_1 to 310_n.

For example, as illustrated in FIG. 3, the Hall period and q-axis current (torque) of the motor 20 when the motor 20 is driven with the motor output of the motor 20 being constant at a predetermined value are measured in advance through experiments, simulations, or the like. Next, a regression analysis using measurement values of the Hall period and the q-axis current is performed to calculate an approximate function (for example, a linear function) representing the relationship between the Hall period and the q-axis current for each motor output. For example, information representing those approximate functions (coefficients of linear functions, for example) are stored in the storage unit 31 of the motor drive control device 1 as the correspondence information 310_1 to 310_n. Hereinafter, the correspondence information 310_1 to 310_n is also referred to as "functions 310_1 to 310_n".

For example, it is assumed that the fan unit 100 is applied to a dryer, and the motor output of the dryer (motor 20) can be set to three levels (n=3) of "weak (5 W)", "medium (10 W)", and "strong (15 W)". In this case, the coefficient of the approximate function representing the relationship between the measurement value of the Hall period and the measurement value of the q-axis current when the motor output is constant at "weak (5 W)" is stored in the storage unit 31 as the correspondence information 310_1. Similarly, the coefficient of the approximate function representing the relationship between the measurement value of the Hall period and the measurement value of the q-axis current when the motor output is constant at "medium (10 W)" is stored in the storage unit 31 as correspondence information 310_2, and the coefficient of the approximate function representing the relationship between the measurement value of the Hall period and the measurement value of the q-axis current when the motor output is constant at "strong (15 W)" is stored in the storage unit 31 as correspondence information 310_3.

The target torque determination unit 30 calculates the target torque value Tg based on the output command signal Sf, the value based on the rotation speed of the motor 20, and the functions 310_1 to 310_n stored in the storage unit 31. Specifically, as illustrated in FIG. 2, the target torque determination unit 30 includes an output command acquisition unit 36, a function selection unit 37, and a target torque calculation unit 38.

The output command acquisition unit 36 is a functional unit configured to acquire a motor output command value from the output command signal Sf input from the outside. For example, when a user operates an operation input unit of the fan 22 to specify a desired output, the operation input unit generates the output command signal Sf indicating the specified output and outputs the output command signal Sf to the output command acquisition unit 36.

The output command acquisition unit 36 acquires a motor output command value from the input output command signal Sf. For example, it is assumed that the motor output of the dryer (motor 20) can be set to three levels of "weak", "medium", and "strong" as described above, and the output command signal Sf is a 2-bit digital signal. In this case, the output command acquisition unit 36 determines which of "weak", "medium", "strong", or "operation stop" is specified by the motor output command value, based on a 2-bit logical value of the output command signal Sf. For example, when the output command signal Sf is "00", the output command acquisition unit 36 determines the signal to be an instruction to stop the dryer (motor 20); when the output command signal Sf is "01", the output command acquisition unit 36 determines the motor output command value for the dryer to be "weak"; when the output command signal Sf is "10", the output command acquisition unit 36 determines the motor output command value for the dryer to be "medium"; and when the output command signal Sf is "11", the output command acquisition unit 36 determines the motor output command value for the dryer to be "strong".

The function selection unit 37 selects any one of the functions 310_1 to 310_n based on the motor output command value acquired by the output command acquisition unit 36. The function selection unit 37 selects, of the functions 310_1 to 310_n, a function corresponding to the motor output of the motor 20 specified by the motor output command value acquired by the output command acquisition unit 36, and reads the function from the storage unit 31.

The target torque calculation unit 38 uses the function 310 selected by the function selection unit 37 to calculate the target torque value Tg from the value based on the rotation speed of the motor 20.

First, the target torque calculation unit 38 calculates a value based on the rotation speed of the motor 20. For example, the target torque calculation unit 38 calculates the Hall period Hp as a value based on the rotation speed, based on the rotation position detection signals Hu, Hv, and Hw. Specifically, the target torque calculation unit 38 calculates the period of any one of the rotation position detection signals Hu, Hv, and Hw, and sets the calculated period as the Hall period Hp.

Note that the method of calculating the Hall period Hp is not limited to the above-described approach. For example, the target torque calculation unit 38 may calculate an average value of the periods of the three rotation position detection signals Hu, Hv, and Hw and set the average value as the Hall period Hp, or may combine the three rotation position detection signals Hu, Hv, and Hw to generate a three phase combined signal by a known approach and calculate the Hall period Hp based on the period of the three phase combined signal.

Next, the target torque calculation unit 38 calculates the target torque value Tg of the motor 20 based on the calculated Hall period Hp and the function 310 selected by the function selection unit 37. For example, the target torque calculation unit 38 calculates the target value Iq_g of the q-axis current by assigning the value of the Hall period Hp calculated based on the rotation position detection signals Hu, Hv, and Hw to the variable (Hall period) in the function 310, and outputs the calculated target value Iq_g of the q-axis current as the target torque value Tg.

The torque acquisition unit 32 is a functional unit configured to acquire a measurement value of the torque of the motor 20. For example, the torque acquisition unit 32 acquires the q-axis current Iq calculated in the process of vector control calculation performed by the drive control signal generation unit 35 described later. The torque acquisition unit 32 calculates the torque value Ts based on the q-axis current Iq calculated in the drive control signal generation unit 35. For example, the torque acquisition unit 32 outputs the q-axis current Iq calculated in the drive control signal generation unit 35 as the torque value Ts.

The method of calculating the torque value Ts by the torque acquisition unit 32 is not limited to the above-described approach. For example, the torque acquisition unit 32 may calculate an average value of the q-axis current Iq for each predetermined period and output the calculated value as the torque value Ts, or may output a value obtained by multiplying the q-axis current Iq or the average value of the q-axis current Iq for each predetermined period by a predetermined coefficient as the torque value Ts. When the torque acquisition unit 32 converts the q-axis current Iq into torque, for example, the target torque calculation unit 38 may calculate the torque value Ts by multiplying the target value Iq_g of the q-axis current calculated using the correspondence information 310 by a predetermined coefficient, or a function indicating the relationship between the value obtained by converting the q-axis current into torque and the Hall period Hp may be used as the correspondence information 310.

The error calculation unit 33 is a functional unit configured to calculate the difference between the target torque value Tg determined by the target torque determination unit 30 and the torque value Ts being the measurement value of the torque of the motor 20 acquired by the torque acquisition unit 32. The error calculation unit 33 outputs the difference between the target torque value Tg and the torque value Ts as a torque error $\Delta T$.

The target rotation speed determination unit 34 is a functional unit configured to determine the target rotation speed EXC of the motor 20 for reducing the difference between the target torque value Tg and the torque value Ts. As illustrated in FIG. 2, the target rotation speed determination unit 34 includes a PI control calculation unit 40 and a target rotation speed calculation unit 41. The PI control calculation unit 40 calculates, by a PI control calculation, a control amount for bringing the torque error $\Delta T$ to zero. Thus, the target rotation speed calculation unit 41 determines the target rotation speed EXC of the motor 20, the target rotation speed EXC being a speed for reducing the difference between the target torque value Tg and the torque value Ts acquired by the torque acquisition unit 32. For example, the target rotation speed calculation unit 41 multiplies the control amount calculated by the PI control calculation unit 40 by a predetermined conversion coefficient to calculate the target rotation speed EXC.

Generally, in a fan, for example, when the rotation speed of the motor is increased, the air resistance increases and the load (torque) increases. In contrast, when the rotation speed of the motor is decreased, the air resistance decreases, and thus the load decreases. That is, in the fan, when the rotation speed of the motor is controlled, the torque error $\Delta T$ can be controlled to take a value of 0. At this time, when an output signal of the PI control calculation unit 40 is a 10-bit digital value, the output signal is an operation amount signal expressed by 0 to 1023. Therefore, the target rotation speed determination unit 34 multiplies the output signal (digital value) of the PI control calculation unit 40 by a predetermined conversion coefficient to convert the operation amount output from the PI control calculation unit 40 into the target rotation speed EXC.

Note that, instead of multiplying the output signal of the PI control calculation unit 40 by a predetermined conversion coefficient, the target rotation speed determination unit 34 may calculate the target rotation speed EXC from the output signal of the PI control calculation unit 40 by performing Q-formatting (fixed point) or saturation processing of upper and lower limits.

Note that, when the target rotation speed determination unit 34 and the drive control signal generation unit 35 are formed by different integrated circuit devices (ICs), the target rotation speed determination unit 34 may generate a periodic signal having a frequency corresponding to the target rotation speed EXC, for example. In this case, the periodic signal is output from an external terminal of the integrated circuit device formed with the target rotation speed determination unit 34, and input into an external terminal of the integrated circuit device formed with the drive control signal generation unit 35. The drive control signal generation unit 35 analyses the frequency of the input periodic signal to acquire information about the target rotation speed EXC.

The drive control signal generation unit 35 is a functional unit configured to generate the drive control signal Sd for causing the rotation speed of the motor 20 to approach the target rotation speed EXC. For example, the drive control signal generation unit 35 generates the drive control signal Sd as a PWM signal by a so-called vector control calculation. Note that the method of generating the drive control signal Sd by the drive control signal generation unit 35 is not limited to the vector control calculation described above, and may be a calculation based on a known motor drive control technique such as of control or lead angle control. However, in the present embodiment, description is given assuming that the drive control signal generation unit 35 generates the drive control signal Sd by the vector control calculation.

In the vector control calculation, the drive control signal generation unit 35 calculates, based on currents flowing in the coils of the respective phases of the motor 20, each of the q-axis current Iq corresponding to the torque of the motor 20 and the d-axis current Id corresponding to the magnetic flux of the motor 20, determines a duty cycle for making the q-axis current Iq calculated and the d-axis current Id calculated respectively equal to the target current values Iq_ref and Id_ref corresponding to the target rotation speed EXC, and outputs a PWM signal having the duty cycle as the drive control signal Sd.

The present embodiment describes a case where the drive control signal generation unit 35 performs vector control calculation using the rotation position detection signals Hu, Hv, and Hw output from the Hall elements, but this is not intended as a limitation, and the drive control signal generation unit 35 may perform so-called sensorless vector control calculation without using the rotation position detection signals Hu, Hv, and Hw.

Figure 4:
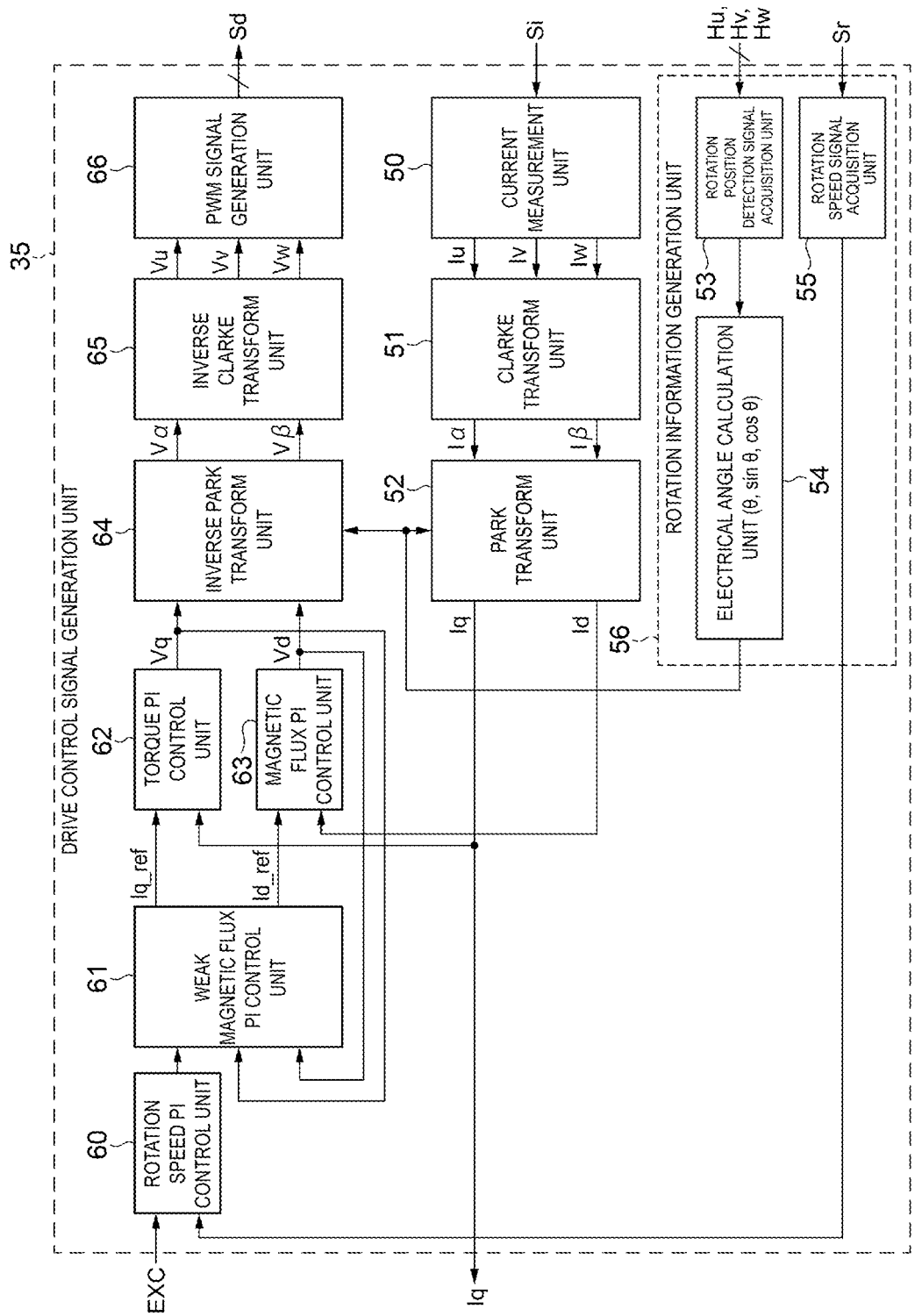
FIG. 4 is a block diagram illustrating an internal configuration of a drive control signal generation unit.

FIG. 4 is a block diagram illustrating an internal configuration of the drive control signal generation unit 35.

The drive control signal generation unit 35 includes a current measurement unit 50, a Clarke transform unit 51, a Park transform unit 52, a rotation information generation unit 56, a rotation speed PI control unit 60, a weak magnetic flux PI control unit 61, a torque PI control unit 62, a magnetic flux PI control unit 63, an inverse Park transform unit 64, an inverse Clarke transform unit 65, and a PWM signal generation unit 66, as functional blocks for functioning as a vector control unit.

In a program processing device constituting the control circuit 3, these functional blocks are achieved by a processor executing various types of calculation processing in accordance with a program stored in a memory, and controlling a peripheral circuit such as a counter and an A/D conversion circuit. Note that a part or the whole of these functional blocks may be achieved by a dedicated hardware circuit.

The current measurement unit 50 acquires the current detection signal Si output from the current detector 27, and generates measurement values of phase currents Iu, Iv, and Iw of the respective phases of the motor 20, based on the acquired current detection signal Si. The Clarke transform unit 51 applies a Clarke transform to the measurement values of the phase currents Iu, Iv, and Iw generated by the current measurement unit 50, to calculate currents I$\alpha$ and I$\beta$ of a two-phase Cartesian coordinate (fixed coordinate) system ($\alpha,\beta$). The Park transform unit 52 applies a Park transform to the currents I$\alpha$ and I$\beta$ by using an electric angle $\theta$ (sin $\theta$ and cos $\theta$) calculated by the electric angle calculation unit 54, to calculate the q-axis current Iq and the d-axis current Id of rotation coordinates from the currents I$\alpha$ and I$\beta$ having two-phase fixed coordinates.

Here, the q-axis current Iq is a current (torque current) corresponding to the torque of the motor 20, and the d-axis current Id is an excitation current of the motor 20.

The rotation information generation unit 56 is a functional unit configured to generate information (rotation information) regarding the rotation state of the motor 20. The rotation information generation unit 56 calculates a rotation angle $\theta$ of the rotor of the motor 20, sin $\theta$, and cos $\theta$ and the rotation speed (actual rotation speed) of the motor 20 as the rotation information of the motor 20.

The rotation information generation unit 56 includes, for example, a rotation position detection signal acquisition unit 53, an electric angle calculation unit 54, and a rotation speed signal acquisition unit 55. The rotation position detection signal acquisition unit 53 acquires the rotation position detection signals (Hall signals) Hu, Hv, and Hw output from the rotation position detectors 25*u*, 25*v*, and 25*w*. Based on the three rotation position detection signals Hu, Hv, and Hw acquired by the rotation position detection signal acquisition unit 53, the electric angle calculation unit 54 calculates the rotation angle $\theta$ of the rotor of the motor 20, and also calculates sin $\theta$ and cos $\theta$ by a known calculation approach. The rotation speed signal acquisition unit 55 acquires a rotation speed signal (FG signal) Sr output from the rotation speed detector 26, and based on the acquired rotation speed signal Sr, acquires a measurement value of the rotation speed of the motor 20.

Note that when the drive control signal generation unit 35 performs the above-described sensorless vector control, the rotation information generation unit 56 may calculate the rotation angle θ of the rotor, sin θ, cos θ, and the rotation speed (ω) by a known sensorless vector control calculation.

The rotation speed PI control unit 60 performs a PI control calculation, based on the target rotation speed EXC of the motor 20 output from the target rotation speed determination unit 34 and the measurement value of the rotation speed of the motor 20 acquired by the rotation speed signal acquisition unit 55. The rotation speed PI control unit 60 calculates the difference between the target rotation speed EXC and the measurement value of the rotation speed of the motor 20, and calculates the control amount for reducing the difference by the PI control calculation.

Based on voltage command values Vq and Vd described later and the control amount calculated by the rotation speed PI control unit 60, the weak magnetic flux PI control unit 61 calculates, by a known calculation method, each of the q-axis current target value Iq_ref, being the target value of the torque current, and the d-axis current target value Id_ref, being the target value of the excitation current.

The torque PI control unit 62 performs the PI control calculation, based on the q-axis current target value Iq_ref calculated by the weak magnetic flux PI control unit 61 and the q-axis current Iq calculated by the Park transform unit 52. The torque PI control unit 62 calculates the difference between the q-axis current target value Iq_ref and the q-axis current Iq, and calculates, by the PI control calculation, the voltage command value Vq as a control amount for reducing the difference. The magnetic flux PI control unit 63 calculates the difference between the d-axis current target value Id_ref and the d-axis current Id, and calculates, by the PI control calculation, the voltage command value Vd as a control amount for reducing the difference.

The inverse Park transform unit 64 applies an inverse Park transform to the voltage command values Vq and Vd by using the electric angle θ (sin θ and cos θ) calculated by the electric angle calculation unit 54, to calculate voltages Vα and Vβ having two-phase fixed coordinates from the rotation coordinates. The inverse Clarke transform unit 65 calculates phase voltages Vu, Vv, and Vw of the three phases by applying an inverse Clarke transform to the voltages Vα and Vβ having two-phase fixed coordinates.

Based on the phase voltages Vu, Vv, and Vw of the respective phases calculated by the inverse Clarke transform unit 65, the PWM signal generation unit 66 calculates duty cycles (setting values of the duty cycles of the respective phases) Udu, Vdu, and Wdu for generating PWM signals of the three phases by a known calculation approach. The PWM signal generation unit 66 generates the PWM signals of the three phases having the calculated duty cycles of the respective phases and outputs the generated PWM signals as the drive control signals Sd.

Next, a processing flow of the constant motor output control by the motor drive control device 1 according to the present embodiment will be described.

Figure 5:
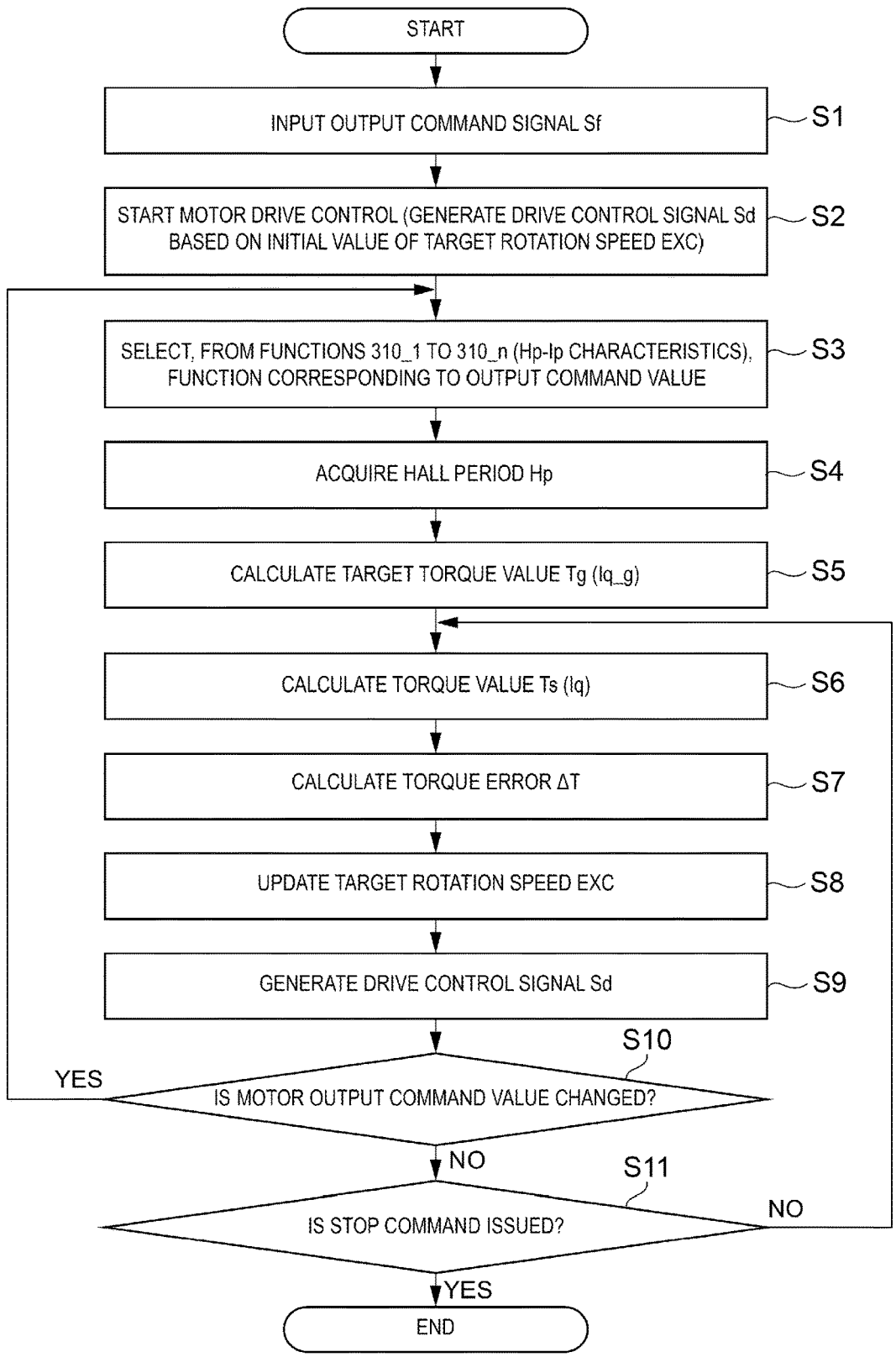
FIG. 5 is a flowchart of a processing flow illustrating constant motor output control by the motor drive control device according to the present embodiment.

FIG. 5 is a flowchart of the processing flow illustrating the constant motor output control by the motor drive control device 1 according to the present embodiment.

For example, it is assumed that when the operation of the fan (for example, dryer) 22 is stopped, a user operates the operation input unit of the fan 22 to instruct the fan 22 to operate at a predetermined output. In this case, the operation input unit of the fan 22 inputs, in response to the operation of the user, the output command signal Sf including the motor output command value into the motor drive control device 1 (step S1).

When the output command signal Sf is input, the motor drive control device 1 starts to control the drive of the motor 20 (step S2). Specifically, in the motor drive control device 1, for example, the target torque determination unit 30 reads, from the storage unit 31, an initial value of the target rotation speed EXC corresponding to the motor output command value specified by the output command signal Sf and sets the initial value of the target rotation speed EXC in the target rotation speed determination unit 34, and the target rotation speed determination unit 34 inputs the set initial value of the target rotation speed EXC to the drive control signal generation unit 35. The drive control signal generation unit 35 performs the above-described vector control calculation, based on the initial value of the target rotation speed EXC input from the target rotation speed determination unit 34 to generate the drive control signal Sd, and inputs the drive control signal Sd into the motor drive circuit 2. Thus, the motor 20 starts to rotate.

Subsequently, the target torque determination unit 30 selects the function 310 corresponding to the motor output command value specified in step S1 (step S3). Specifically, as described above, the function selection unit 37 reads, from the storage unit 31, the function 310 corresponding to the motor output command value specified by the output command signal Sf, and provides the function 310 to the target torque calculation unit 38.

The target torque calculation unit 38 acquires the Hall period Hp (step S4). For example, as described above, the target torque calculation unit 38 acquires the period of at least one of the rotation position detection signals Hu, Hv, and Hw as the Hall period Hp.

Next, the target torque calculation unit 38 calculates the target torque value Tg (the target value Iq_g of the q-axis current) from the Hall period Hp calculated in step S4 using the function 310 read out in step S3 by the above-described approach (step S5).

In the motor drive control device 1, the torque acquisition unit 32 calculates the torque of the motor 20 (step S6). Specifically, as described above, the torque acquisition unit 32 acquires the q-axis current Iq calculated by the drive control signal generation unit 35 by the vector control calculation, and calculates the torque value Ts (the measurement value of the torque) of the motor 20, based on the q-axis current Iq.

Subsequently, in the motor drive control device 1, the error calculation unit 33 calculates the torque error ΔT, the torque error ΔT being the difference between the target torque value Tg (the target value Iq_g of the q-axis current) calculated in step S5 and the torque value Ts (the q-axis current Iq) calculated in step S6 (step S7).

Subsequently, in the motor drive control device 1, the target rotation speed determination unit 34 calculates, from the torque error ΔT calculated in step S7, the target rotation speed EXC by the above-described approach (step S8). Thus, the value of the target rotation speed EXC is updated, based on the torque error ΔT reflecting the actual drive state of the motor 20.

Subsequently, in the motor drive control device 1, the drive control signal generation unit 35 determines the duty cycle of the PWM signal being the drive control signal Sd, based on the target rotation speed EXC updated in step S8, generates the drive control signal Sd having the determined duty cycle, and provides the drive control signal Sd to the motor drive circuit 2 (step S9).

Thus, the rotation speed of the motor 20 is adjusted to take the value of the target rotation speed EXC, and the torque of the motor 20 is adjusted to take the value of the target torque value Tg. That is, the Hall period Hp corresponding to the rotation of the motor 20 and the torque of the motor 20 are controlled to follow the Hall period-torque characteristics shown in FIG. 3, whereby the motor 20 operates with the motor output of the motor 20 (fan 22) being constant at the value designated in step 51.

Subsequently, the motor drive control device 1 determines whether a motor output designation value is changed (step S10). If the motor output command value is changed by the new output command signal Sf (Yes in step S10), the motor drive control device 1 proceeds to step S3 and executes the above-described processing (S3 to S9). That is, the motor drive control device 1 reads the function 310 corresponding to the new motor output command value, updates the target torque value Tg (the target value Iq_g of the q-axis current), and generates the drive control signal Sd and controls the rotation of the motor 20 based on the newly calculated target rotation speed EXC. Thus, the fan 22 operates at the newly specified constant motor output.

On the other hand, if the motor output command value is not changed (No in step S10), the motor drive control device 1 determines whether a stop of the operation of the fan 22 has been instructed (step S11). If the stop of the operation of the fan 22 has not been instructed by the output command signal Sf (No in step S11), the motor drive control device 1 proceeds to step S5 and executes the above-described processing (S6 to S9), generating the drive control signal Sd for causing the fan 22 to continue to operate at the motor output specified in step S1.

On the other hand, if the stop of the operation of the fan 22 has been instructed (Yes in step S11), the motor drive control device 1 stops the rotation of the motor 20 by the drive control signal Sd. For example, the target torque determination unit 30 (for example, the output command acquisition unit 36) instructs the target rotation speed determination unit 34 (for example, the target rotation speed calculation unit 41) to set the target rotation speed EXC to zero. Therefore, the rotation of the motor 20 stops, and the fan 22 is stopped.

Figure 6:
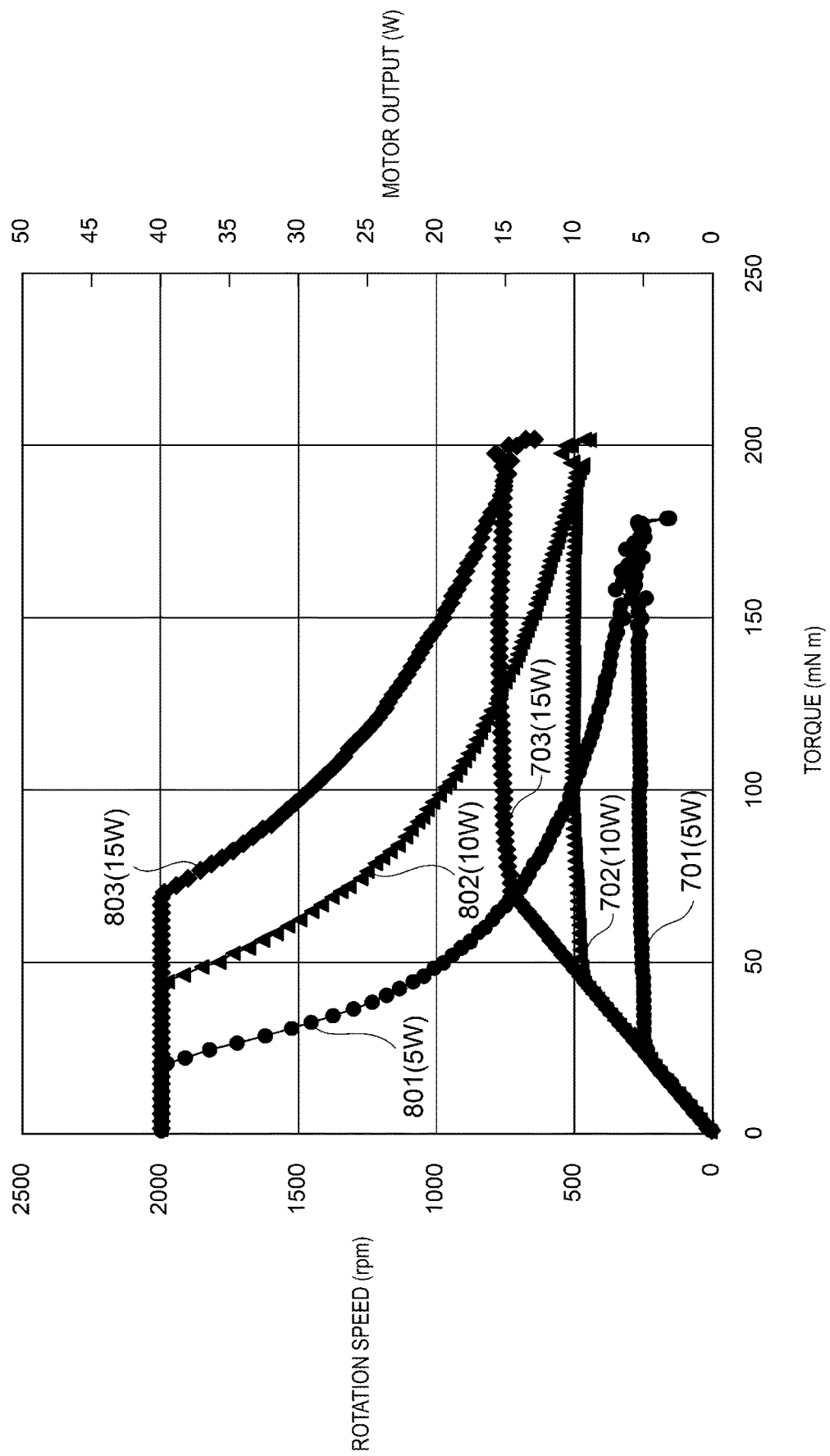
FIG. 6 is a diagram showing the characteristics of a motor when constant motor output control is performed by the motor drive control device according to the present embodiment.

FIG. 6 is a graph showing characteristics of the motor 20 when the motor drive control device 1 performs the constant motor output control.

In FIG. 6, the horizontal axis represents the torque (mN·m) of the motor 20, the left side of the vertical axis represents the rotation speed (rpm) of the motor 20, and the right side of the vertical axis represents the motor output (W).

Reference sign 701 indicates a change (measured value) in the motor output with respect to the torque of the motor 20 when the motor output is constant at 5 W. Reference sign 801 indicates a change (measured value) in the rotation speed with respect to the torque of the motor 20 when the motor output is constant at 5 W. Reference sign 702 indicates a change (measured value) in the motor output with respect to the torque of the motor 20 when the motor output is constant at 10 W. Reference sign 802 indicates a change (measured value) in the rotation speed with respect to the torque of the motor 20 when the motor output is constant at 10 W. Reference sign 703 indicates a change (measured value) in the motor output with respect to the torque of the motor 20 when the motor output is constant at 15 W. Reference sign 803 indicates a change (measured value) in the rotation speed with respect to the torque of the motor 20 when the motor output is constant at 15 W.

As shown in FIG. 6, according to the motor drive control device 1 of the present embodiment, it can be understood that the motor output becomes constant when the rotation speed (Hall period Hp) is controlled to follow the change in the torque of the motor 20.

As described above, in the motor drive control device 1 according to the present embodiment, the storage unit 31 stores in advance the correspondence information (Hall period-torque characteristics) 310_1 to 310_n indicating the relationship between the value based on the rotation speed (for example, Hall period Hp) and the torque of the motor 20 when the motor output of the motor 20 is constant at a predetermined value. The motor drive control device 1 calculates the target torque value Tg from the value based on the rotation speed of the motor 20 by using the correspondence information 310 corresponding to the specified motor output command value. The motor drive control device 1 determines the target rotation speed EXC of the motor for reducing the difference between the calculated target torque value and the measured torque value of the motor 20, and generates, based on the target rotation speed EXC, the drive control signal Sd to drive the motor 20.

Accordingly, the motor drive control device 1 determines the target rotation speed EXC of the motor 20 according to the relationship between the value based on the rotation speed and the torque of the motor 20 at the specified motor output value, and thus can cause the motor 20 to rotate with the motor output being constant.

Further, in the motor drive control device 1, the relationship between the value based on the rotation speed and the torque of the motor 20 at a predetermined motor output is stored in advance in the storage unit 31 as the correspondence information 310, and the motor drive control device 1 uses the correspondence information 310 to calculate the target torque value from the value based on the rotation speed, and thus no complicated calculation is required to calculate the target torque value. Therefore, it is possible to reduce the processing load of the microcontroller and the like constituting the control circuit 3.

Thus, according to the motor drive control device 1 according to the present embodiment, the motor output can be controlled to be constant by a simple configuration and calculation. That is, it is possible to achieve constant motor output control by using a cheaper microcontroller instead of an expensive microcontroller capable of executing complicated calculations at high speed.

Furthermore, in the motor drive control device 1, the correspondence information 310 includes a function expressing the relationship between the value based on the rotation speed and the torque of the motor 20, and the storage unit 31 stores the functions 310_1 to 310_n for the respective command values for a plurality of the motor outputs specifiable in the fan 22.

Accordingly, even when a plurality of motor outputs can be selected in the fan 22, a function of the value based on the rotation speed-torque characteristics for the specified motor output is properly selected from the functions 310_1 to 310_n, and thus it is possible to control the motor 20 with the motor output being constant at a specified value.

In the motor drive control device 1, the value based on the rotation speed of the motor 20 is the period (Hall period Hp) of the rotation position detection signals Hu, Hv, and Hw having a voltage periodically changing in accordance with the rotation position of the rotor of the motor 20.

Accordingly, calculating the target torque value Tg becomes easier as will be described below.

If the rotation speed itself is used as the value based on the rotation speed of the motor 20, the torque (target torque value) and the rotation speed are in an inversely proportional relationship, and "division" is required to calculate the target torque value from the rotation speed, and thus the processing load of the microcontroller as the control circuit 3 increases. On the other hand, when the Hall period Hp is used as the value based on the rotation speed of the motor 20, the torque (target torque value) and the Hall period Hp are in a proportional relationship (see Equation (4)), and thus the control circuit 3 may perform "multiplication" to calculate the target torque value from the Hall period Hp. Accordingly, the processing load of the control circuit 3 can be suppressed, and a more inexpensive microcontroller can be used as the control circuit 3.

The motor drive control device 1 acquires the q-axis current Iq calculated by the so-called vector control calculation as the torque value Ts of the motor 20, and calculates the target value Iq_g of the q-axis current as the target torque value Tg.

Accordingly, the torque acquisition unit 32 does not need to perform complicated calculation processing in order to calculate the torque value Ts of the motor 20, and thus it is possible to achieve constant motor output control by a simpler and cheaper configuration. For example, it is assumed that the drive control signal generation unit (vector control unit) 35 in the motor drive control device 1 is implemented by an existing integrated circuit device (IC) for vector control calculation, and the target torque determination unit 30, the storage unit 31, the torque acquisition unit 32, and the target rotation speed determination unit 34 in the motor drive control device 1 are implemented by an integrated circuit device different from the integrated circuit device for vector control calculation mentioned above.

In this case, the integrated circuit device used for implementing the target torque determination unit 30, the storage unit 31, the torque acquisition unit 32, and the target rotation speed determination unit 34 does not need to perform a complicated calculation such as vector control in order to calculate the torque value Ts. Therefore, an inexpensive microcontroller having limited functions can be employed for this integrated circuit device.

Expansion of Embodiment

The invention conceived by the present inventors has been specifically described above based on the embodiments. However, the present invention is not limited to the embodiments, and of course, various modifications can be made without departing from the gist of the present invention.

For example, in the above-described embodiment, when the drive control signal generation unit 35 calculates the rotation speed by the sensorless vector control calculation, the target torque calculation unit 38 may calculate the target torque value Tg by the above-described approach using the reciprocal of the rotation speed calculated by the drive control signal generation unit 35 as the Hall period Hp.

The method of detecting the rotation speed of the motor is not particularly limited. For example, when the motor 20 is driven by sensorless drive control without using a Hall element, the motor drive control device 1 (control circuit 30) may detect the rotation speed by using the back electromotive force of the motor 20. In this case, the target torque calculation unit 38 may calculate the target torque value Tg by the above-described approach using, for example, the reciprocal of the detected rotation speed as the Hall period Hp.

The control circuit 3 is not limited to the circuit configuration described above. Various circuit configurations configured to meet the object of the present invention can be applied to the control circuit 3.

The flowchart described above is a specific example, and the processing flow is not limited to this flowchart. For example, other processing may be inserted between each of the steps, or processing may be performed in parallel.

The number of phases of the motor driven by the motor drive control device 1 according to the embodiment described above is not limited to three phases. Furthermore, the number of Hall elements is not limited to three.

REFERENCE SIGNS LIST

1 Motor drive control device, 2 Motor drive circuit, 2a Inverter circuit, 2b Pre-drive circuit, 3 Control circuit, 20 Motor, 21 Impeller (bladed wheel), 22 Fan, 25, 25u, 25v, 25w Rotation position detector (Hall element), 26 Rotation speed detector, 27 Current detector, 30 Target torque determination unit, 31 Storage unit, 32 Torque acquisition unit, 33 Error calculation unit, 34 Target rotation speed determination unit, 35 Drive control signal generation unit (vector control unit), 36 Output command acquisition unit, 37 Function selection unit, 38 Target torque calculation unit, 40 PI control calculation unit, 41 Target rotation speed calculation unit, 50 Current measurement unit, 51 Clarke transform unit, 52 Park transform unit, 53 Rotation position detection signal acquisition unit, 54 Electric angle calculation unit, 55 Rotation speed signal acquisition unit, 56 Rotation information generation unit, 60 Rotation speed PI control unit, 61 Weak magnetic flux PI control unit, 62 Torque PI control unit, 63 Magnetic flux PI control unit, 64 Inverse Park transform unit, 65 Inverse Clarke transform unit, 66 PWM signal generation unit, 100 Fan unit, 310, 310_1 to 310_n Correspondence information (function), EXC Target rotation speed, Id d-axis current, Id_ref d-axis current target value, Iq q-axis current, Iq_ref q-axis current target value, Iq_g q-axis current target value, Sd Drive control signal, Sf Output command signal, Si Current detection signal, Sr Rotation speed signal (FG signal), Tg Target torque value, Ts Torque value, ΔT Torque error.

The invention claimed is:

1. A motor drive control device, comprising:
a control circuit configured to output a drive control signal for controlling drive of a motor; and
a motor drive circuit configured to drive the motor based on the drive control signal output from the control circuit,
wherein the control circuit includes:
a storage unit configured to store correspondence information indicating a relationship between a value based on a rotation speed and a torque of the motor when a motor output of the motor is constant at a predetermined value,
a target torque determination unit configured to determine a target torque value from the value based on the rotation speed of the motor by using the correspondence information corresponding to the motor output specified,
a torque acquisition unit configured to acquire a torque value of the motor,
a target rotation speed determination unit configured to determine a target rotation speed of the motor, the target rotation speed being a speed for reducing a difference between the target torque value and the torque value acquired by the torque acquisition unit, and a drive control signal generation unit configured to generate the drive control signal based on the target rotation speed, wherein the torque acquisition unit acquires a value of a q-axis current corresponding to the torque of the motor as the torque value, and the target torque determination unit determines a target value of the q-axis current as the target torque value, wherein the motor includes coils in three phases, wherein the drive control signal generation unit calculates, based on currents flowing in the coils of respective phases of the motor, each of the q-axis current and a d-axis current corresponding to a magnetic flux of the motor, determines a duty cycle for making the q-axis current calculated and the d-axis current calculated respectively equal to target current values corresponding to the target rotation speed, and outputs a PWM signal having the duty cycle as the drive control signal, and wherein the torque acquisition unit acquires the q-axis current calculated by the drive control signal generation unit as the torque value.

2. The motor drive control device according to claim 1, wherein the value based on the rotation speed of the motor is a period of a rotation position detection signal having a voltage periodically changing in accordance with a rotation position of a rotor of the motor.

3. The motor drive control device according to claim 1, wherein the value based on the rotation speed of the motor is a reciprocal of the rotation speed of the motor.

4. The motor drive control device according to claim 1, wherein the correspondence information includes a function expressing a relationship between the value based on the rotation speed and the torque of the motor, and the storage unit stores the function for each of command values for a plurality of the motor outputs specifiable.

5. A fan unit, comprising:
the motor drive control device according to claim 1;
the motor configured to be driven by the motor drive control device; and
an impeller configured to rotate by a rotation force of the motor.

* * * * *